US 6,542,474 B1

(12) United States Patent
Lau (10) Patent No.: US 6,542,474 B1
(45) Date of Patent: Apr. 1, 2003

(54) SYSTEM AND METHOD FOR INCREMENTALLY UPDATING REMOTE ELEMENT LISTS IN AN ELECTRONIC NETWORK

(75) Inventor: Clement Ka-Mun Lau, Los Altos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/259,504

(22) Filed: Feb. 26, 1999

(51) Int. Cl.[7] .............................................. G06F 13/00
(52) U.S. Cl. ...................... 370/257; 710/104
(58) Field of Search ................................ 370/254, 255, 370/256, 257, 258; 710/104, 8, 9, 10, 11; 709/223, 201, 209, 224; 340/824.25

(56) References Cited

U.S. PATENT DOCUMENTS

| 5,420,573 | A | | 5/1995 | Tanaka et al. ......... 340/825.24 |
| 5,537,605 | A | | 7/1996 | Teece ........................ 395/800 |
| 5,732,072 | A | * | 3/1998 | Thanner et al. ............ 370/255 |
| 5,796,951 | A | | 8/1998 | Hamner et al. ........ 395/100.53 |
| 5,991,842 | A | * | 11/1999 | Takayama .................. 710/105 |
| 6,067,573 | A | * | 5/2000 | Tam et al. .................. 709/242 |
| 6,160,796 | A | * | 12/2000 | Zou ........................... 370/257 |

FOREIGN PATENT DOCUMENTS

WO      9935856      7/1999

OTHER PUBLICATIONS

Copyright 1997, 1998 by Grundig, Hitachi, Matsushita, Philips, Sharp, Sony, Thomson and Toshiba; The HAVi Architecture, Version 0.8, Specification of the Home Audio/Video Interoperability (HAVi) Architecture; May 11, 1998; pp. I–XIV and 1–195.

* cited by examiner

Primary Examiner—Ken Vanderpuye
(74) Attorney, Agent, or Firm—Gregory J. Koerner; Simon & Koerner LLP (57) ABSTRACT

A system and method for incrementally updating remote element lists in an electronic network comprises a communication media manager that notifies an event manager whenever the electronic network is altered by a network event that adds or removes devices. The event manager responsively notifies a device-control module manager that is subscribed for notification when a network event occurs. The device-control module manager responsively generates a network analysis to various software elements in the electronic network to indicate either the addition or removal of a device on the network. A local registry element may then receive the network analysis and responsively generate an updated remote registry list, in accordance with the present invention.

40 Claims, 7 Drawing Sheets

SYSTEM AND METHOD FOR INCREMENTALLY UPDATING REMOTE ELEMENT LISTS IN AN ELECTRONIC NETWORK

CROSS-REFERENCE TO RELATED APPLICATIONS

This application relates to U.S. patent application Ser. No. 09/257,344, entitled "System And Method For Implementing Active Registries In An Electronic Network," filed on Feb. 25, 1999, which is hereby incorporated by reference. The cross-referenced applications are commonly assigned.

BACKGROUND OF THE INVENTION

1. Field of the Invention

This invention relates generally to electronic networks, and relates more particularly to a system and method for incrementally updating remote element lists in an electronic network.

2. Description of the Background Art

Implementing an efficient and effective method for managing and controlling communications between electronic devices in an electronic network is a significant consideration for system designers, manufacturers, and users of contemporary electronic devices An electronic device in a distributed electronic network may advantageously communicate with other remote electronic devices in the network to share and substantially increase the resources available to individual devices in the network. For example, an electronic network may be implemented in a user's home to enable flexible and beneficial sharing of resources between various consumer electronic devices, such as personal computers, digital video disk devices, digital set-top boxes for digital broadcasting, television sets, and audio playback systems.

Managing and controlling efficient communications in a network of electronic devices may create substantial challenges for designers and manufacturers of electronic networks. For example, enhanced design demands for increasing functionality and performance many require more system processing power and require additional hardware resources over the network. An increase in processing or hardware requirements also typically results in a corresponding detrimental economic impact from increased production costs and operational inefficiencies.

Network size and device functionality are also factors that affect the control and management of an electronic network. Communications in an electronic network typically become more complex as the number of individual devices or nodes increases. For example, a local software element on a given network device may need to communicate with various remote software elements on remote devices on the network. However, successfully managing a substantial number of electronic devices on a single network may provide significant benefits to a system user. Furthermore, enhanced device capability to perform various advanced functions may provide additional benefit to a system user, but may also place increased demands on the control and management of various devices in the electronic network. For example, an electronic network that effectively accesses, processes, and displays digital television programming may benefit from efficient network management techniques because of the large amount and complexity of the digital data involved.

In addition, periodically altering the configuration of an electronic network by a system user may present a need for creating transparent and efficient techniques to manage the addition or removal of electronic devices in the network. For example, if a new electronic device is added to the network, then the other electronic devices in the network may require notification of the existence and capabilities of the newly-added device, so that all electronic devices in the network may advantageously utilize resources from the newly-added electronic device.

Therefore, for all the foregoing reasons, implementing an efficient and effective method for managing communications between various electronic devices in a distributed electronic network remains a significant consideration for designers, manufacturers, and users of electronic devices.

SUMMARY OF THE INVENTION

In accordance with the present invention, a system and method are disclosed for incrementally updating remote element lists in an electronic network. In one embodiment of the invention, initially, a network bus triggers a bus reset in response to the occurrence of an event on the electronic network. For example, the event may include a removed device event in which an existing device is removed from the electronic network. The event may also include an added device event in which a new device is added to the electronic network.

In response to the bus reset on the network bus, a communication media manager (CMM) preferably sends a bus change event message to an event manager via a messaging system. The bus change event message preferably includes information to specify whether the event is a removed device event or an added device event. The event manager preferably permits other software elements in the network software to subscribe for immediate notification whenever certain specified events occur in the electronic network.

In one embodiment, each device-control module (DCM) manager in the network always subscribes for prompt notification of any bus change event from the corresponding local event manager, so that the DCM managers may then conduct a negotiation process for determining an appropriate host device for the newly-added device on the electronic network. Therefore, in response to the bus change event message received from the CMM, the event manager transmits an event notification message to the DCM manager through the messaging system.

The DCM manager then preferably extracts the content of the event notification message to responsively generate a bus change analysis result, and also processes the event based on the type of event (removed device event or added device event). In addition to normal processing (including the device hosting negotiations), the DCM manager also advantageously provides the bus change analysis result to a local registry via a private (non-standardized format) message, in accordance with the present invention.

The registry responsively utilizes the bus change analysis result to produce an updated remote registry list that reflects the recent change in the electronic network. The present invention may similarly update remote element lists for other software elements in network software. For example, in one embodiment, the DCM manager also provides the bus change analysis result to the event manager which responsively produces an updated remote event manager list that reflects the recent change in the electronic network. Any software element in the network software may thus optionally post an event on a local event manager to globally notify remote software elements through corresponding remote event mangers. The present invention thus effectively and efficiently updates incremental remote element lists in an electronic network.

DETAILED DESCRIPTION OF THE PREFERRED EMBODIMENT

The present invention relates to an improvement in electronic network technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system and method for incrementally updating remote element lists in an electronic network, and preferably includes a communication media manager that notifies an event manager whenever the electronic network is altered by a network event that adds or removes devices. The event manager responsively notifies a device-control module manager that is subscribed for notification when a network event occurs. The device-control module manager responsively generates a network analysis to various software elements in the electronic network to indicate either the addition or removal of a device on the network. A local registry element may then receive the network analysis and responsively generate an updated remote registry list, in accordance with the present invention.

Figure 1:
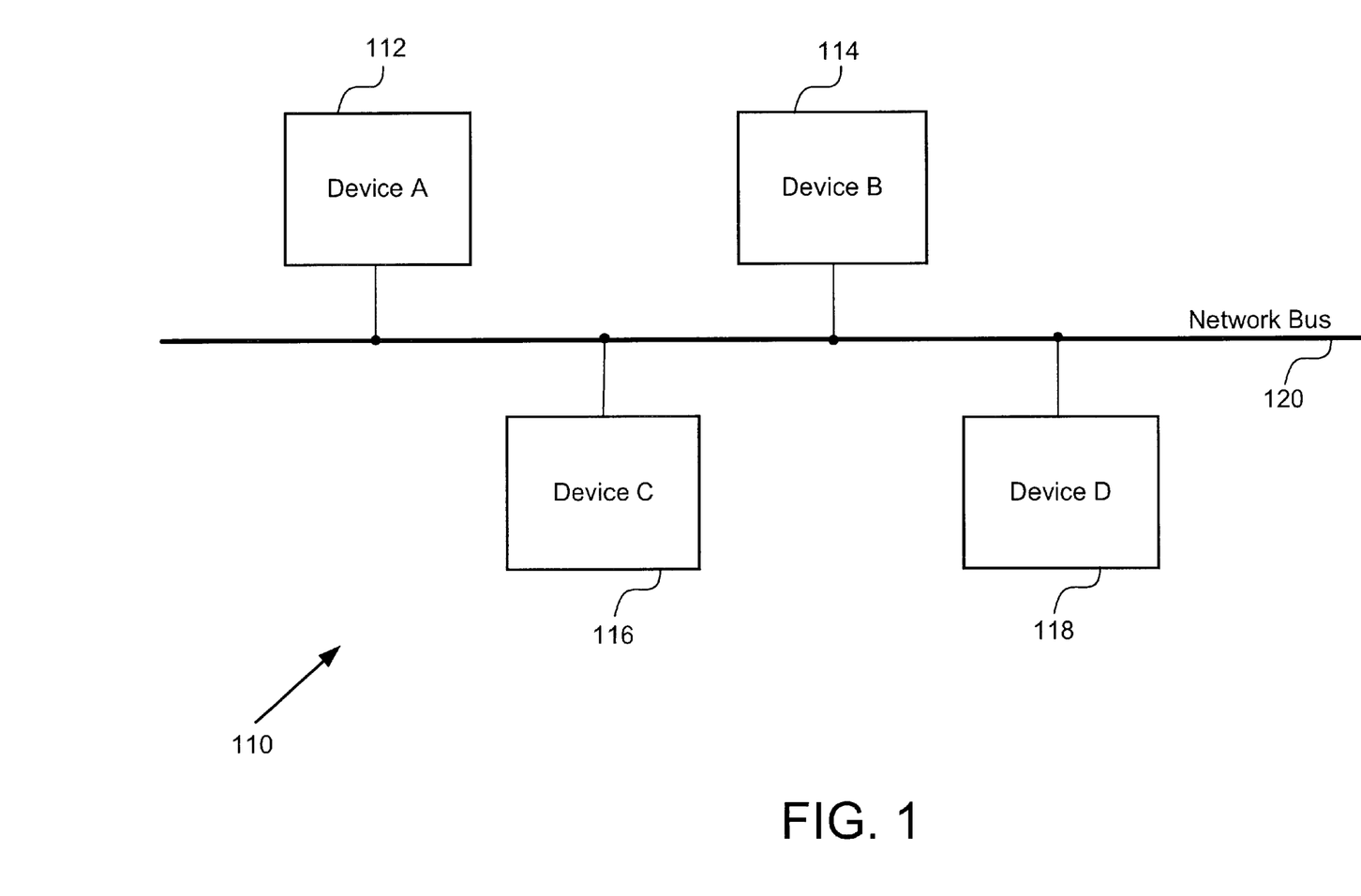
FIG. 1 is a block diagram for one embodiment of an electronic network, in accordance with the present invention.

Referring now to FIG. 1, a block diagram for one embodiment of an electronic network 110 is shown, in accordance with the present invention. In the FIG. 1 embodiment, network 110 includes, but is not limited to, device A 112, device B 114, device C 116, and device D 118. In other embodiments, network 110 may readily be implemented using a larger or smaller number of devices than the four devices (device A 112 through device D 118) shown in the FIG. 1 embodiment.

In the FIG. 1 network 110, device A 112, device B 114, device C 116, and device D 118 preferably communicate with each other through a commonly-shared network bus 120. In the FIG. 1 embodiment, network bus 120 is preferably implemented according to the IEEE 1394 interconnectivity standard. However, in alternate embodiments, other appropriate and compatible interconnectivity standards are also contemplated for use in conjunction with the present invention.

In the FIG. 1 embodiment, network 110 is preferably configured to operate in accordance with the Home Audio/Video Interoperability (HAVi) core specification (version 1.0 beta, Nov. 19, 1998) which is hereby incorporated by reference. Therefore, device A 112, device B 114, device C 116, and device D 118 may be implemented as various types of consumer electronics devices, including, but not limited to, personal computers, digital video disk devices, television sets, audio reproduction systems, video tape recorders (VCRs), and set-top boxes for digital video broadcasting. However, in various alternate embodiments, network 110 may readily be implemented as any appropriate electronic network configured to permit communication between any desired types of electronic devices.

In the FIG. 1 embodiment, the various electronic devices that form part of network 110 preferably include the following four categories of electronic devices: full devices (FD), intermediate devices (ID), base devices (BD), and legacy device (LD). The foregoing four categories of electronic devices (FD, ID, BD, and LD) are further discussed below in conjunction with FIGS. 2 and 3. In alternate embodiments of the present invention, network 110 may readily includes various other categories of electronic devices in addition to, or instead of, the four categories of FD, ID, BD, and LD.

Figure 2:
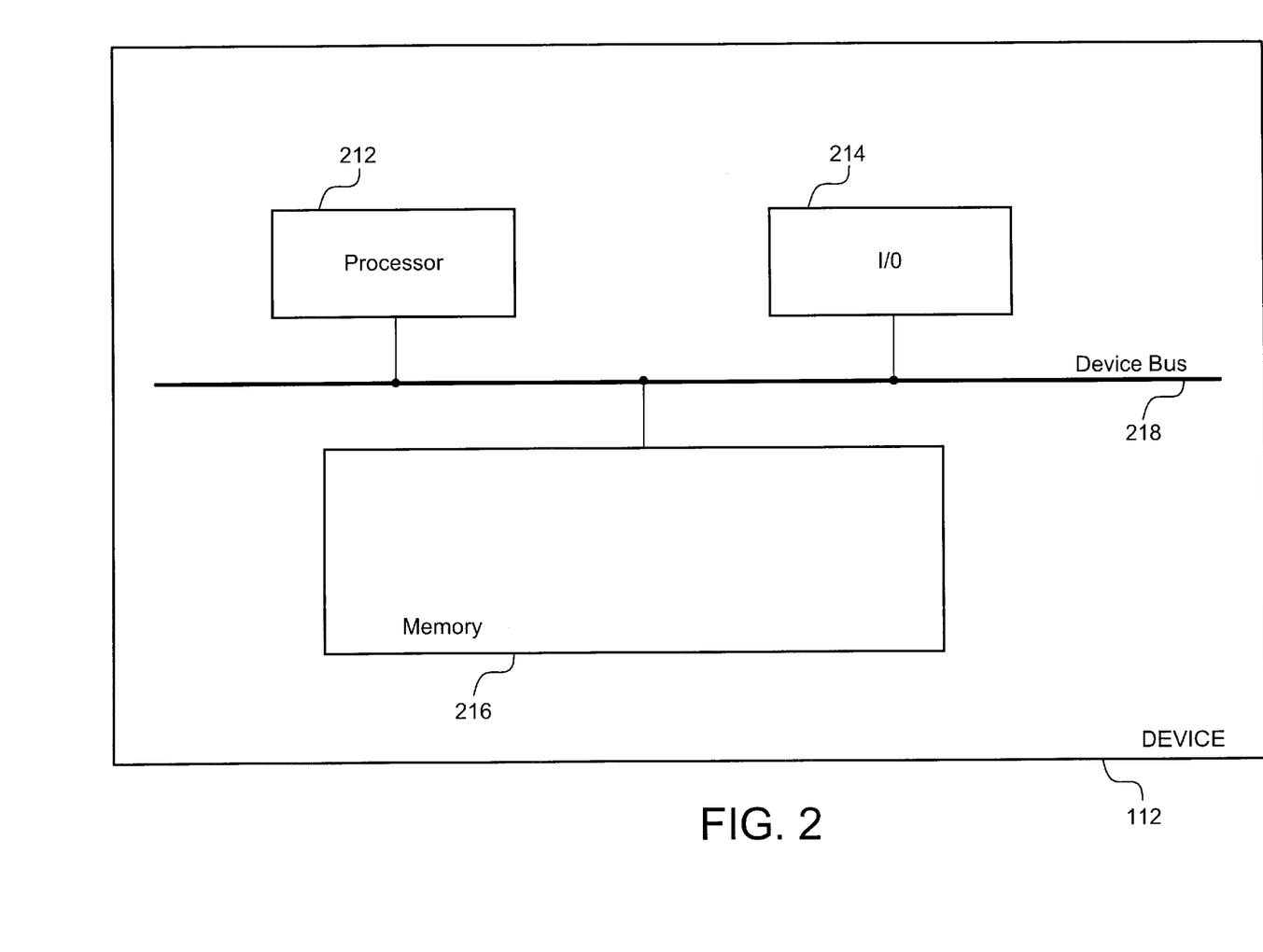
FIG. 2 is a block diagram for one embodiment of an exemplary device from FIG. 1, in accordance with the present invention.

Referring now to FIG. 2, a block diagram for one embodiment of an exemplary device 112 from FIG. 1 is shown, in accordance with the present invention. In the FIG. 2 embodiment, device 112 preferably includes, but is not limited to, a processor 212, an input/output interface (I/O) 214, and a memory 216 that are each coupled to, and communicate with each other via, a common device bus 218. In the FIG. 2 embodiment, device 112 is preferably configured to represent either a full device or an intermediate device, as referred to above in the discussion of the FIG. 1 network 110.

In the FIG. 2 embodiment, processor 212 may be implemented to include any appropriate and compatible generic, multi-purpose microprocessor device. The FIG. 2 input/output interface (I/O) 214 preferably provides an effective interface to facilitate communications between device 112 and network bus 120 (FIG. 1). In the FIG. 2 embodiment, memory 216 may be implemented to include any combination of desired storage devices, including, but not limited to, read-only memory (ROM), random-access memory (RAM), and various types of non-volatile memory, such as floppy disks or hard disks. The contents and functionality of memory 216 are further discussed below in conjunction with FIGS. 3 and 4.

Figure 3:
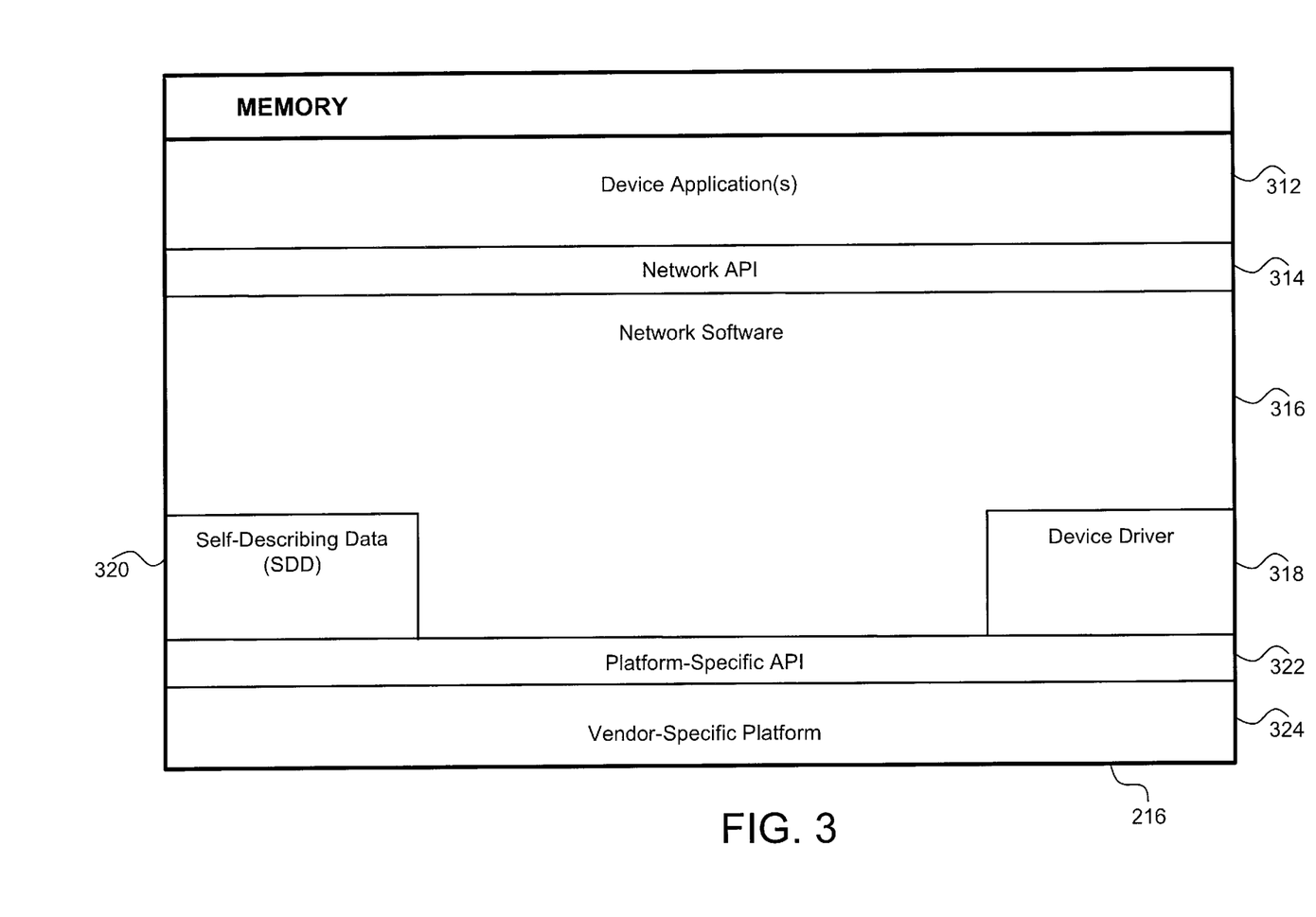
FIG. 3 is a memory map for one embodiment of the memory of FIG. 2, in accordance with the present invention.

Referring now to FIG. 3, a memory map for one embodiment of memory 216 of FIG. 2 is shown, in accordance with the present invention. In the FIG. 3 embodiment, memory 216 includes one or more device applications 312, a network application program interface (API) 314, network software 316, self-describing data (SDD) 320, a device driver 318, a platform-specific application program interface (API) 322, and a vendor-specific platform 324. In alternate embodiments, memory 216 may readily include various components and elements that are different from, or in addition to, those software components 312 through 324 discussed in conjunction with the FIG. 3 embodiment.

In the FIG. 3 embodiment, device application 312 preferably includes software instructions that are executed by processor 212 (FIG. 2) to effectively manage and control the functionality of device 112. Network API 314 preferably serves as an interface between various elements of network software 316 and device application 312.

In the FIG. 3 embodiment, network software 316 preferably includes one or more software elements that are executed by processor 212 to advantageously permit device 112 to communicate and cooperate with other devices in network 110. The contents and functionality of network software 316 are further discussed below in conjunction with FIG. 4.

Self-describing data (SDD) 320 preferably includes various relevant information regarding device 112. For example, SDD 320 may include information specifying the manufacturer, model, version, serial number, and other fixed data that specifically corresponds to device 112. Device driver 318 preferably includes appropriate software instructions that permit device 112 to communicate with network bus 120 (FIG. 1).

In the FIG. 3 embodiment, platform-specific API 322 provides an interface that preferably permits network software 316 to communicate with vendor-specific platform 324. In the FIG. 3 embodiment, vendor-specific platform 324 may include basic operating system software for supporting low-level operations of device 112.

The FIG. 3 embodiment of memory 216 typically corresponds to a full device (or FD, as discussed above in conjunction with FIG. 1) that preferably includes a complete set of network software 316 to permit optimal compatibility and functionality with network 110. Alternately, memory 216 may correspond to an intermediate device (ID) which includes only a reduced set of software elements from network software 316. In contrast, a base device (BD) is preferably hosted on network 110 by a full device or an intermediate device, and therefore typically does not include network software 316. A base device, however, preferably does include self-describing data 320 and a device driver 318.

A legacy device (LD) may be defined as a device that does not comply with the architectural specifications of network 110 and network software 316. Legacy devices typically were designed and manufactured prior to the design and implementation of network 110 and network software 316. Therefore, a legacy device is preferably hosted on network 110 by a full device or an intermediate device, and typically does not include network software 316 or self-describing data 320. A digital base device, however, may include a device driver 318 for interfacing with network bus 120.

Figure 4:
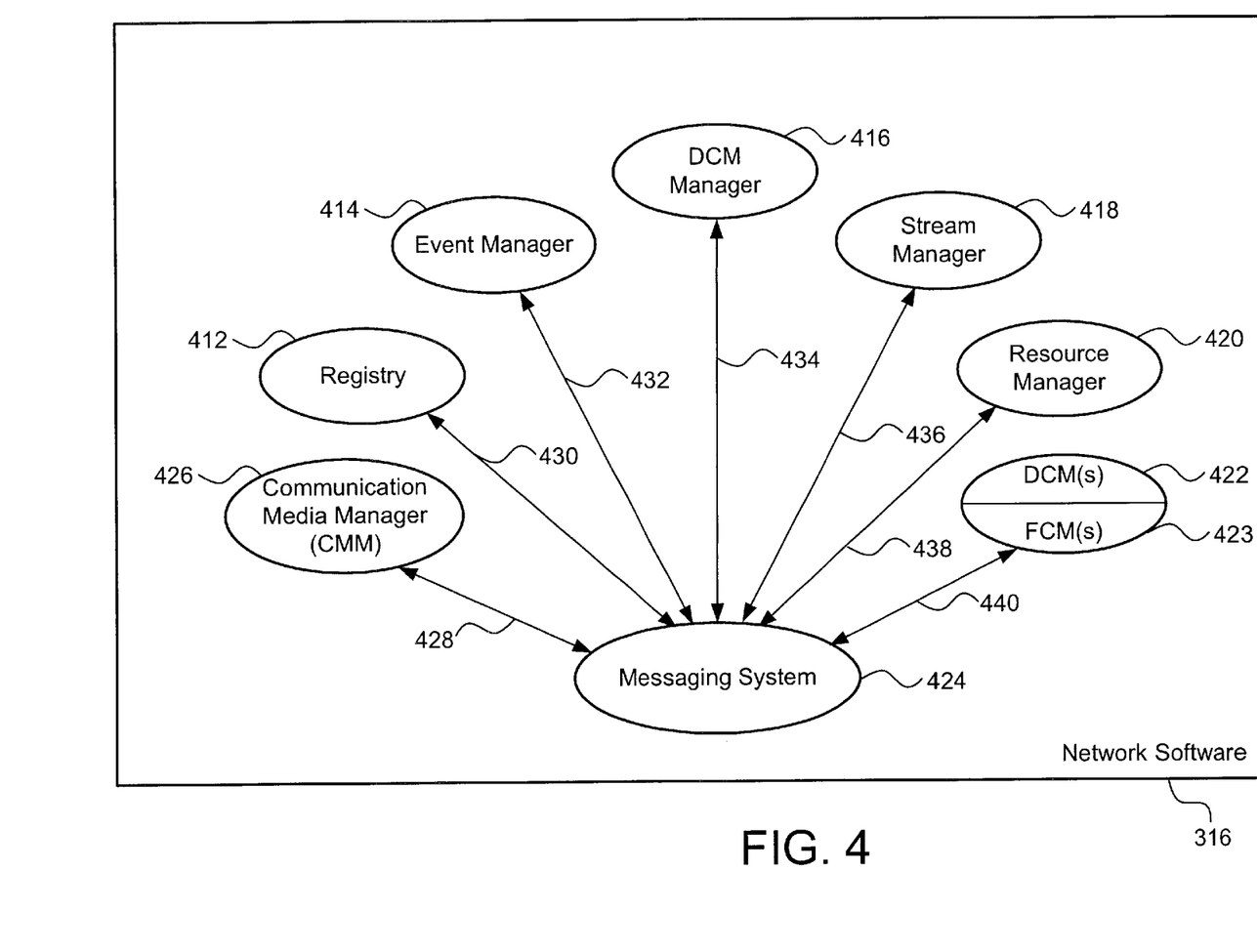
FIG. 4 is a diagram for one embodiment of the network software of FIG. 3, in accordance with the present invention.

Referring now to FIG. 4, a diagram for one embodiment of the network software 316 of FIG. 3 is shown, in accordance with the present invention. In the FIG. 4 embodiment, network software 316 preferably comprises a number of software elements, including a registry 412, an event manager 414, a device-control module (DCM) manager 416, a stream manager 418, a resource manager 420, one or more device control modules (DCMs) 422 and one or more corresponding functional control modules (FCMs) 423, a messaging system 424, and a communication media manager (CMM) 426.

In the FIG. 4 embodiment, software elements 412 through 426 are preferably configured to function in accordance with the Home Audio/Video Interoperability (HAVi) architecture which has previously been incorporated herein by reference. However, in alternate embodiments, network software 316 may readily conform to any other appropriate and compatible interoperability architecture, and may also include various elements that are different from, or in addition to, those elements 412 through 426 that are presented in the FIG. 4 embodiment.

In the FIG. 4 embodiment, registry 412 preferably includes a listing of all local software elements in network software 316. Registry 412 also preferably may include relevant element information corresponding to the listed software elements. For example, elements 412 through 426 from network software 316 and corresponding element information may be listed in registry 412. Registry 412 thus may serve as a directory service for software elements in network 110 to allow any software element to locate another software element in network 110. In accordance with the present invention, registry 412 may also include a remote registry list that identifies all remote registries on network 110.

In the FIG. 4 embodiment, event manage 414 preferably serves as an network-event notification service to notify various software elements (that have previously subscribed for notification) about the occurrence of a specified network event, such as a change in a software element or a change in network 110. DCM manager 416 is preferably responsible for installing and removing DCMs 422 on full devices or intermediate devices. Stream manager 418 is preferably responsible for managing real-time transfer of data and other information between various functional components of network 110.

In the FIG. 4 embodiment, resource manager 420 preferably facilitates sharing of various resources and scheduling of various actions in network 110. A device control module (DCM) 422 preferably includes a software element that is used control a specific associated device on network 110. A given DCM 422 preferably includes one or more directly-corresponding functional control modules (FCMs) 423 that each control a specific functional component within the particular device 112 that corresponds to the FCM 423. A full device or an intermediate device may preferably host a DCM 422 to control a corresponding base device or a legacy device on network 110. In an intermediate device, the hosted DCM 422 is preferably embedded as part of network software 316. In a full device, the hosted DCM 422 may be downloaded from the corresponding remote device in network 110.

In the FIG. 4 embodiment, messaging system 424 is preferably responsible for bi-directionally transferring various messages between the software elements of network software 316. Communication media manager (CMM) 426 coordinates and manages asynchronous and isochronous communications through device driver 318 onto network bus 120. In addition to software elements 412 through 426 of network software 316, a full device may also include a bytecode runtime environment (not shown) to permit the full device to download and execute one or more remote DCM (s) 422 to thereby host and control other devices on network 110.

Network software 316 preferably performs a number of significant and related operations whenever a particular device is removed from, or added to, network 110. When a device is added or removed from network 110, then network bus 120 triggers a bus reset event which notifies all connected devices about the change in network 110. Following the bus reset event, all DCM managers 416 in network 110 preferably perform a negotiation procedure to determine which, if any, DCM manager 416 is the most appropriate host for controlling the newly-added device 112. Each DCM manager 416 in network 110 must therefore maintain a current list of all devices in network 110.

Network software 316 preferably also updates relevant information in registry 412 whenever a device is removed from, or added to, network 110. For example, if a device application 312 sends a query to a local registry 412 on local device 112 to obtain information about all devices on network 110, then, because of economic constraints on local data capacity, local registry 412 must forward the query to all remote registries 412 on other non-local devices in network 110. Therefore, a given local registry 412 preferably includes a list of all remote registries 412 in network 110.

In one embodiment of the present invention, following a bus reset event, each local registry 412 calls the local communication media manager (CMM) 426 to obtain a new list of current devices in network 110. Each local registry 412 then identifies any changes in network 110, and responsively constructs an updated device list. Next, for each device on the updated device list, each local registry must retrieve data from each of the corresponding remote devices to determine the device type. If a particular remote device is a full device or an intermediate device (which each typically include individual remote registries 412), then each local registry 412 must add a corresponding software element identifier (SEID) for the full device or intermediate device to create an updated list of remote registries. The foregoing procedure for updating remote registry lists typically generates significant traffic on network bus 120, and also requires a substantial amount of processing resources across network 110. Another embodiment of the present invention to more efficiently and effectively update remote registry lists is further discussed below in conjunction with FIGS. 5 through 7.

Figure 5:
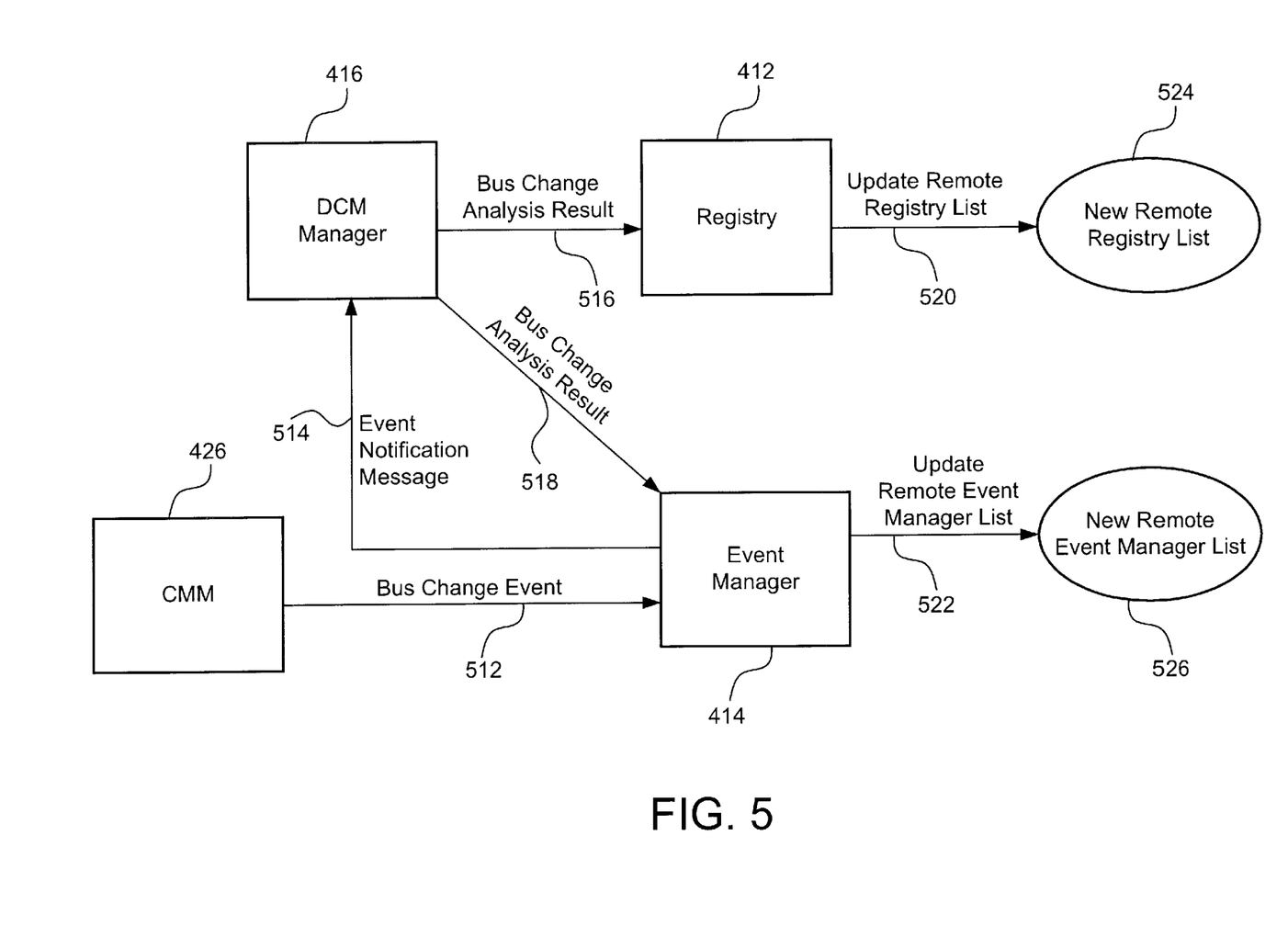
FIG. 5 is a block diagram illustrating the incremental updating of remote element lists, in accordance with one embodiment of the present invention.

Referring now to FIG. 5, a block diagram illustrating the incremental updating of remote element lists is shown, in accordance with one embodiment of the present invention. In the FIG. 5 embodiment, initially, network bus 120 triggers a bus reset in response to the occurrence of an event on network 110. For example, the event may include a removed device event in which an existing device is removed from network 110. The event may also include an added device event in which a new device is added to network 110.

In response to the bus reset on network bus 120, communication media manager (CMM) 426 preferably sends a bus change event message 512 to event manager 414 via messaging system 424 (not shown). Bus change event message 512 preferably includes information to specify whether the event is a removed device event or an added device event. Event manager 414 preferably is configured to permit other software elements in network software 316 to subscribe for immediate notification whenever certain specified events occur in network 110.

In the FIG. 5 embodiment, each DCM manager 416 in network 110 always subscribes for prompt notification of any bus change event from the corresponding local event manager 414, so that the DCM managers 416 may then conduct the negotiation process for determining the appropriate device hosting assignments, as discussed above in conjunction with FIG. 4. Therefore, in response to bus change event message 512 received from CMM 426, event manager 414 transmits an event notification message 514 to DCM manager 416 through messaging system 424.

DCM manager 416 then preferably extracts the content of event notification message 514 to generate a bus change analysis result, and also processes the event based on the type of event (removed device event or added device event). Processing of events by DCM manager 416 is further discussed below in conjunction with FIG. 7. In addition to normal processing (including the device hosting negotiations), DCM manager 416 also advantageously provides the bus change analysis result 516 to registry 412 via a private (non-standardized format) message, in accordance with the present invention.

Registry 412 responsively utilizes bus change analysis result 516 to perform an update remote registry list procedure 520 to produce a new remote registry list 524 that reflects any changes in network 110. The present invention may similarly update remote element lists for other software elements in network software 316. In the FIG. 5 embodiment, DCM manager 416 also provides a same or similar bus change analysis result 518 to event manager 414 which responsively performs an update remote event manager list procedure 522 to produce a new remote event manager list 526 that reflects any changes in network 110. Any local software element in network software 316 may thus optionally post an event on local event manager 414 to globally notify remote software elements through remote event mangers 414.

Figure 6:
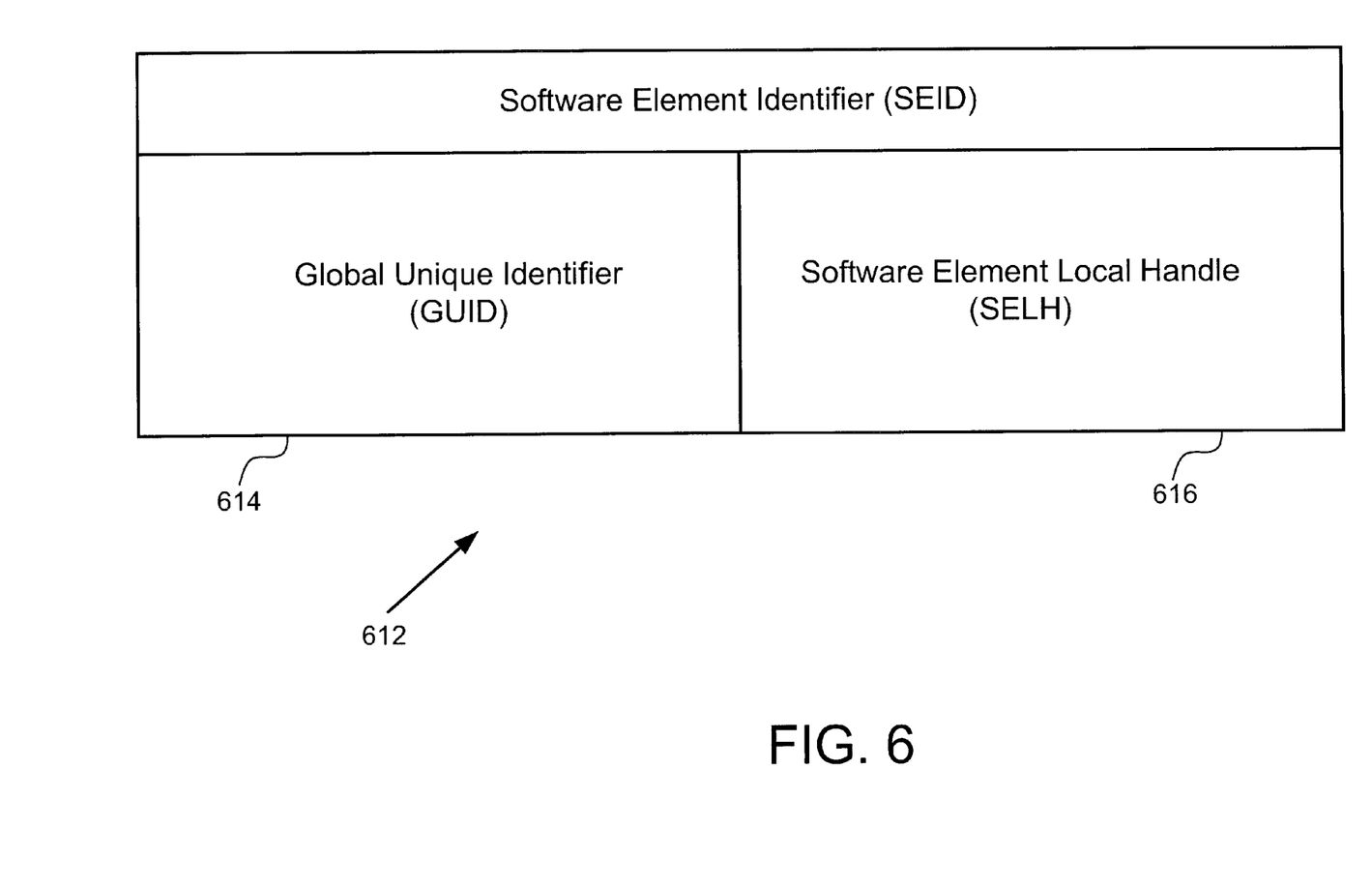
FIG. 6 is a diagram for one embodiment of a software element identifier, in accordance with the present invention.

Referring now to FIG. 6, a diagram for one embodiment of a software element identifier (SEID) 612 is shown, in accordance with the present invention. SEID 612 preferably includes information that uniquely identifies and corresponds to individual software elements in the network software 316 across network 110. In the FIG. 6 embodiment, SEID 612 preferably includes a global unique identifier (GUID) 614 and a software element local handle (SELH) 616. GUID 614 preferably includes unique identification information that corresponds to only one particular device 112. SELH 616 preferably includes identification information that corresponds only to a single type of software element. For example, all registries 412 in network 110 may preferably be assigned the same SELH 616. In other embodiments of the present invention, SEID 612 may readily be configured to include various information that is different from, or in addition to, the information presented in the FIG. 6 embodiment.

Figure 7:
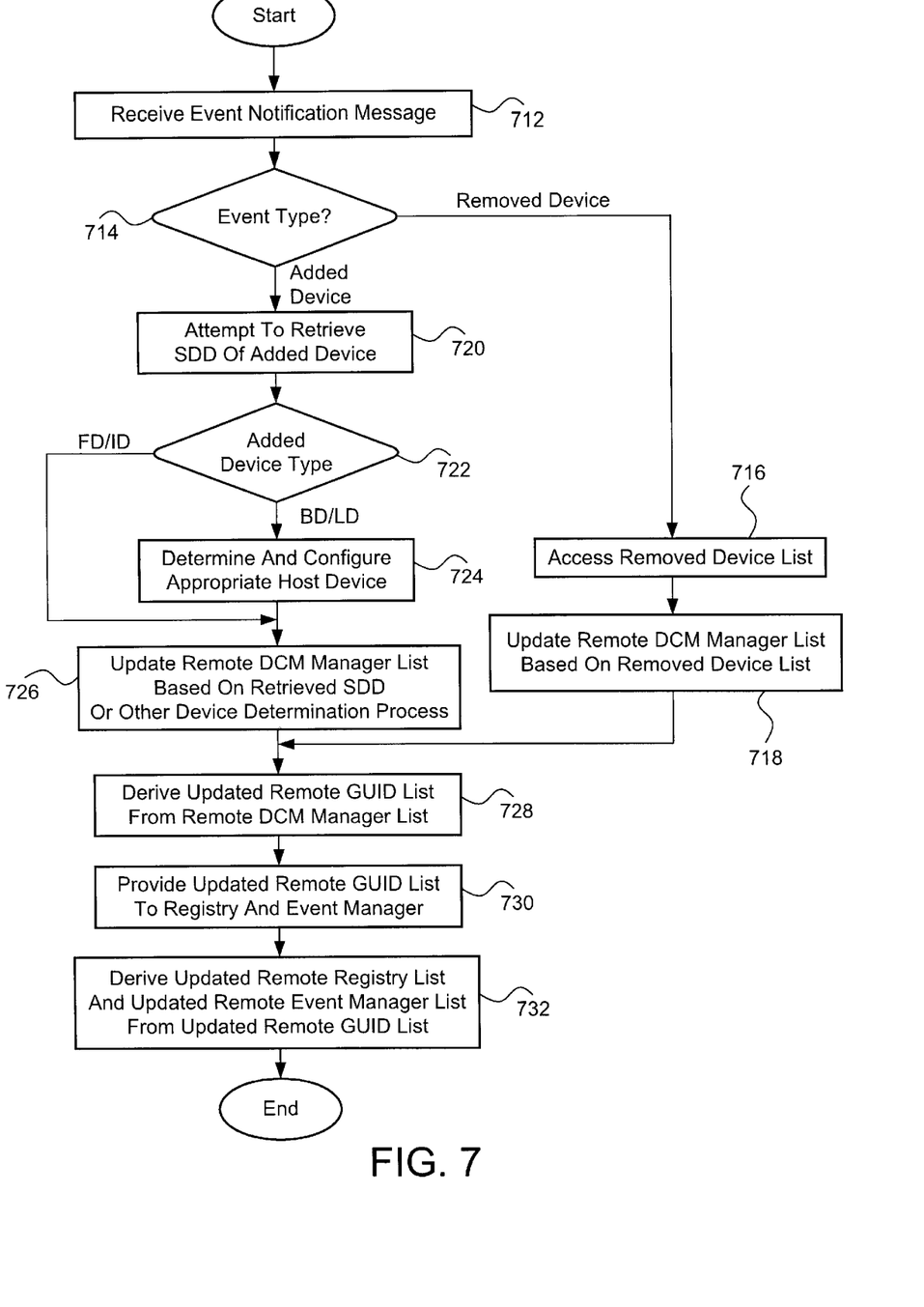
FIG. 7 is a flowchart of method steps for incrementally updating remote element lists, in accordance with one embodiment of the present invention.

Referring now to FIG. 7, a flowchart of method steps for incrementally updating remote element lists is shown, in accordance with one embodiment of the present invention. In the FIG. 7 embodiment, initially, in step 712, DCM manager 416 receives an event notification message 514 from event manager 414 in response to the occurrence of an event on network 110. In step 714, DCM manager 416 analyzes event notification message 514 to determine an event type corresponding to the recent event on network 110.

If the event is a removed device event, then, in step 716, DCM manager 416 accesses a removed device list from communication media manager (CMM) 426 to determine which device has been removed from network 110. In the FIG. 6 embodiment, the removed device list preferably includes the GUID 614 of the removed device. Then, in step 718, DCM manager 416 updates its remote DCM manager list based on the removed device list obtained in foregoing step 716. DCM manager 416 preferably identifies the SEID 612 of the removed remote DCM manager 416 by using the GUID 614 of the removed device. DCM manager 416 then preferably deletes the SEID 612 of the remote DCM manager from its remote DCM manager list. The FIG. 7 process then advances to step 728.

In foregoing step 714, if the event is an added device event, then, in step 720, DCM manager 416 attempts to retrieve self-describing data (SDD) 320 (FIG. 3) corresponding to the newly-added device. In the case of legacy devices, the attempt to retrieve SDD 320 will fail. Then, in step 722, DCM manager 416 determines the type of device that was added to network 110. If the added device is a full device or an intermediate device, then the FIG. 7 process advances to step 726. However, if the added device is a base device or a legacy device, then all DCM managers in network 110 perform the previously-discussed negotiation process to determine and configure the appropriate host device for the added base device or legacy device.

In step 726, DCM manager 416 updates its remote DMC manager list based on the SDD 320 retrieved in foregoing step 720, or, in the case of legacy devices, based on various other device determination processes, such as referencing embedded device look-up tables. In the FIG. 7 embodiment, SDD 320 preferably includes the GUID 614 of the added device. DCM manager 416 may then create the SEID 612 of the new remote DCM manager 416 by adding an appropriate SELH 616 to the GUID 614 of the added device. DCM manager then preferably adds the SEID 612 of the newly-added remote DCM manager to its remote DCM manager list.

In step 728, DCM manager 416 preferably derives an updated remote GUID list from the remote DCM manager list that was updated in foregoing steps 718 or 728. In the FIG. 7 embodiment, DCM manager 416 may preferably create the updated remote GUID list by removing the software element local handle (SELH) 616 from each SEID 612 on the remote DCM manager list. Then, in step 730, DCM manager 416 advantageously provides the updated remote GUID list to registry 412 as bus change analysis result 516 (FIG. 5). DCM manager 416 similarly may provide the updated remote GUID list to event manage 414 as bus change analysis result 518.

Finally, in step 732, registry 412 derives an updated remote registry list from the updated remote GUID list by preferably adding an appropriate SELH 616 to each of the GUIDs 614 on the updated remote GUID list. Similarly, event manager 414 derives an updated remote event manager list from the updated remote GUID list by preferably adding an appropriate SELH 616 to each of the GUIDs 614 on the updated remote GUID list.

Although described in the context of incrementally updating remote element lists for a single device, the foregoing FIG. 7 method steps are preferably performed by network software 316 in all devices on network 110 whenever a new device is added to network 110, or whenever an existing device is removed from network 110.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for updating an element list of an electronic network, comprising:
   a device-control model manager communicating with said electronic network to generate a network analysis in response to an event on said electronic network; and
   a registry element communicating with said device-control model manager to update said element list using said network analysis, wherein said device-control model manager subscribes with an event manager to be notified whenever a bus change event occurs.

2. A system for updating an element list of an electronic network, comprising:
   a device-control model manager communicating with said electronic network to generate a network analysis in response to an event on said electronic network; and
   a registry element communicating with said device-control model manager to update said element list using said network analysis, wherein said device-control model manager subscribes with an event manager to be notified whenever a bus change event occurs, said device-control model manager and said registry element forming part of network software for a device on said electronic network.

3. The system of claim 2 wherein said network software is configured to comply with a home audio-video interoperability specification.

4. A system for updating an element list of an electronic network, comprising:
   a device-control model manager communicating with said electronic network to generate a network analysis in response to an event on said electronic network, said electronic network including full devices, intermediate devices, base devices, and legacy devices that are connected through a network bus configured using an IEEE 1394 interconnectivity standard of 1995; and
   a registry element communicating with said device-control model manager to update said element list using said network analysis, wherein said device-control model manager subscribes with an event manager to be notified whenever a bus change event occurs.

5. A system for updating an element list of an electronic network, comprising:
   a device-control model manager communicating with said electronic network to generate a network analysis in response to an event on said electronic network; and
   a registry element communicating with said device-control model manager to update said element list using said network analysis, wherein said device-control model manager subscribes with an event manager to be notified whenever a bus change event occurs, said element list including a remote element list of identification information for remote software elements in said electronic network.

6. A system for updating an element list of an electronic network, comprising:
   a device-control model manager communicating with said electronic network to generate a network analysis in response to an event on said electronic network;
   a registry element communicating with said device-control model manager to update said element list using said network analysis, wherein said device-control model manager subscribes with an event manager to be notified whenever a bus change event occurs; and
   a communication media manager that notifies said event manager which responsively notifies said device-control model manager when said electronic network is altered, said device-control model manager responsively generating said network analysis to indicate one of a removed device event or an added device event, said registry element responsively deleting a gone element from said element list for a removed device event, and responsively adding a new element to said element list for an added device event.

7. A system for updating an element list of an electronic network, comprising:
   a device-control model manager communicating with said electronic network to generate a network analysis in response to an event on said electronic network;
   a registry element communicating with said device-control model manager to update said element list using said network analysis, wherein said device-control model manager subscribes with an event manager to be notified whenever a bus change event occurs; and
   a communication media manager that is notified about a bus change event on a network bus by a device driver, said communication media manager responsively sending a bus change event message through a messaging system to said event manager.

8. The system of claim 7 wherein said event manager sends an event notification message to said device-control module manager in response to said bus chant event message from said communication media manager.

9. The system of claim 8 wherein said event notification message specifies one of a removed device event and an added device event for said bus change event.

10. The system of claim 9 wherein, for said removed device event, said device-control module manager accesses a removed device list and responsively updates a remote device-control module manager list based on said removed device list.

11. The system of claim 10 wherein, for said added device event, said device-control module manager attempts to retrieve self-describing data from a new device on said electronic network.

12. The system of claim 11 wherein said device-control module manager determines a device type for said new device, said device type including one of a full device, an intermediate device, a base device, and a legacy device.

13. The system of claim 12 wherein, when said new device is one of said base device and said legacy device, then said device-control module manager performs a negotiation process across said electronic network to determine and configure an appropriate host device for said new device.

14. The system of claim 13 wherein said device-control module manager uses said self-describing data to update said remote device-control module manager list.

15. The system of claim 14 wherein said self-describing data includes a global unique identifier corresponding to said new device on said electronic network.

16. The system of claim 15 wherein said device-control module manager provides said global unique identifier to said registry element as part of said network analysis, said network analysis including an updated global unique identifier list for remote devices on said electronic network.

17. The system of claim 16 wherein said registry element generates said element list by converting said updated global unique identifier list into an updated software element identifier list by adding predetermined software element local handles.

18. The system of claim 15 wherein said device-control module manager provides said global unique identifier to a selectable software element as part of said network analysis, said network analysis including an updated global unique identifier list for remote devices on said electronic network.

19. The system of claim 18 wherein said selectable software element is said event manager which responsively updates a remote event manager list to permit global posting of events across said electronic network.

20. A method for updating an element list of an electronic network, comprising the steps of:
    generating a network analysis with a device-control model manager in response to an event on said electronic network; and
    updating said element list with said network analysis by using a registry element, wherein said device-control model manager subscribes with an event manager to be notified whenever a bus change event occurs.

21. A method for updating an element list of an electronic network, comprising the steps of:
    generating a network analysis with a device-control model manager in response to an event on said electronic network; and
    updating said element list with said network analysis by using a registry element, wherein said device-control model manager subscribes with an event manager to be notified whenever a bus change event occurs, said device-control model manager and said registry element forming part of network software for a device on said electronic network.

22. The method of claim 21 wherein said network software is configured to comply with a home audio-video interoperability specification.

23. A method for updating an element list of an electronic network, comprising the steps of:
    generating a network analysis with a device-control model manager in response to an event on said electronic network, said electronic network including full devices, intermediate devices, base devices, and legacy devices that are connected through a network bus configured using an IEEE 1394 interconnectivity standard of 1995; and
    updating said element list with said network analysis by using a registry element, wherein said device-control model manager subscribes with an event manager to be notified whenever a bus change event occurs.

24. A method for updating an element list of an electronic network, comprising the steps of:
    generating a network analysis with a device-control model manager in response to an event on said electronic network; and
    updating said element list with said network analysis by using a registry element, wherein said device-control model manager subscribes with an event manager to be notified whenever a bus change event occurs, said element list including a remote element list of identification information for remote software elements in said electronic network.

25. A method for updating an element list of an electronic network, comprising the steps of:
    generating a network analysis with a device-control model manager in response to an event on said electronic network;
    updating said element list with said network analysis by using a registry element, wherein said device-control model manager subscribes with an event manager to be notified whenever a bus change event occurs; and
    utilizing a communication media manager to notify said event manager which responsively notifies said device-control model manager when said electronic network is altered, said device-control model manager responsively generating said network analysis to indicate one of a removed device event or an added device event, said registry element responsively deleting a gone element from said element list for a removed device event, and responsively adding a new element to said element list for an added device event.

26. A method for updating an element list of an electronic network, comprising the steps of:
generating a network analysis with a device-control model manager in response to an event on said electronic network;
updating said element list with said network analysis by using a registry element, wherein said device-control model manager subscribes with an event manager to be notified whenever a bus change event occurs, and
notifying a communication media manager about a bus change event on a network bus by using a bus driver, said communication media manager responsively sending a bus change event message through a messaging system to said event manager.

27. The method of claim 26 wherein said event manager sends an event notification message to said device-control module manager in response to said bus change event message from said communication media manager.

28. The method of claim 27 wherein said event notification message specifies one of a removed device event and an added device event for said bus change event.

29. The method of claim 28 wherein, for said removed device event, said device-control module manager accesses a removed device list and responsively updates a remote device-control module manager list based on said removed device list.

30. The method of claim 29 wherein, for said added device event, said device-control module manager attempts to retrieve self-describing data from a new device on said electronic network.

31. The method of claim 30 wherein said device-control module manager determines a device type for said new device, said device type including one of a full device, an intermediate device, a base device, and a legacy device.

32. The method of claim 31 wherein, when said new device is one of said base device and said legacy device, then said device-control module manager performs a negotiation process across said electronic network to determine and configure an appropriate host device for said new device.

33. The method of claim 32 wherein said device-control module manager uses said self-describing data to update said remote device-control module manager list.

34. The method of claim 33 wherein said self-describing data includes a global unique identifier corresponding to said new device on said electronic network.

35. The method of claim 34 wherein said device-control module manager provides said global unique identifier to said registry element as part of said network analysis, said network analysis including an updated global unique identifier list for remote devices on said electronic network.

36. The method of claim 35 wherein said registry element generates said element list by converting said updated global unique identifier list into an updated software element identifier list by adding predetermined software element local handles.

37. The method of claim 34 wherein said device-control module manager provides said global unique identifier to a selectable software element as part of said network analysis, said network analysis including an updated global unique identifier list for remote devices on said electronic network.

38. The method of claim 37 wherein said selectable software element is said event manager which responsively updates a remote event manager list to permit global posting of events across said electronic network.

39. A system for updating an element list-in an electronic network, comprising:
means for generating a network analysis in response to an event on said electronic network; and
means for updating said element list with said network analysis, wherein said means for generating includes a device-control module manager that subscribes with an event manager to be notified whenever a bus change event occurs.

40. A computer-readable medium comprising program instructions for updating an element list of an electronic network by performing the steps of:
generating a network analysis with a device-control model manager in response to an event on said electronic network; and
updating said element list with said network analysis by using a registry element, wherein said device-control model manager subscribes with an event manager to be notified whenever a bus change event occurs.

* * * * *